United States Patent
Cai et al.

(10) Patent No.: US 10,834,641 B2
(45) Date of Patent: Nov. 10, 2020

(54) RESOURCE SELECTION METHOD, APPARATUS, AND DEVICE

(71) Applicant: Huawei Technologies Co., Ltd., Shenzhen (CN)

(72) Inventors: Yu Cai, Beijing (CN); Yongbo Zeng, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/781,382

(22) PCT Filed: Aug. 12, 2016

(86) PCT No.: PCT/CN2016/095054
§ 371 (c)(1),
(2) Date: Jun. 4, 2018

(87) PCT Pub. No.: WO2018/027991
PCT Pub. Date: Feb. 15, 2018

(65) Prior Publication Data
US 2018/0359659 A1    Dec. 13, 2018

(51) Int. Cl.
*H04W 28/26* (2009.01)
*H04W 72/02* (2009.01)
(Continued)

(52) U.S. Cl.
CPC .......... *H04W 28/26* (2013.01); *H04W 72/02* (2013.01); *H04W 72/04* (2013.01);
(Continued)

(58) Field of Classification Search
CPC ..... H04W 72/02; H04W 72/085; Y02D 70/22
See application file for complete search history.

(56) References Cited

U.S. PATENT DOCUMENTS

| 2010/0240312 A1 | 9/2010 | Peng et al. |
| 2013/0072213 A1 | 3/2013 | Agrawal et al. |

(Continued)

FOREIGN PATENT DOCUMENTS

| CN | 101478792 A | 7/2009 |
| CN | 102083208 A | 6/2011 |

(Continued)

OTHER PUBLICATIONS

Lenovo, "UE autonomous resource selection for semi-persistent transmission," XP051090252, 3GPP TSG RAN WG1 Meeting #85, R1-164645, May 23-27, 2016, 3 pages.

(Continued)

*Primary Examiner* — Walli Z Butt
*Assistant Examiner* — Ryan C Kavleski
(74) *Attorney, Agent, or Firm* — Conley Rose, P.C.

(57) ABSTRACT

A resource selection method, an apparatus, and a device, where the method includes determining, by first user equipment (UE), parameter information of a sensing window, where the parameter information includes at least one of a start time, a time span, or a quantity, sensing, by the first UE, the resource in the sensing window according to the parameter information of the sensing window, and selecting, by the first UE, a resource according to a sensing result. According to the resource selection method, the apparatus, and the device, power consumption of UE can be reduced.

20 Claims, 4 Drawing Sheets

First UE determines parameter information of a sensing window according to a usage status of a resource — 201

The first UE senses a resource in the sensing window according to the parameter information of the sensing window, and selects a resource according to a sensing result — 202

(51) Int. Cl.
H04W 72/04 (2009.01)
H04W 74/08 (2009.01)
H04W 72/08 (2009.01)

(52) U.S. Cl.
CPC ..... *H04W 72/0486* (2013.01); *H04W 72/085* (2013.01); *H04W 74/0808* (2013.01); *Y02D 70/00* (2018.01); *Y02D 70/22* (2018.01)

(56) References Cited

U.S. PATENT DOCUMENTS

| 2015/0334760 | A1 | 11/2015 | Sartori et al. | |
| 2017/0070911 | A1* | 3/2017 | Huang | H04W 74/0816 |
| 2017/0188391 | A1* | 6/2017 | Rajagopal | H04W 74/0816 |
| 2017/0311291 | A1 | 10/2017 | Dai et al. | |
| 2018/0242190 | A1* | 8/2018 | Khoryaev | H04W 28/0284 |
| 2019/0182840 | A1* | 6/2019 | Feng | H04W 72/06 |
| 2019/0208504 | A1* | 7/2019 | Yasukawa | H04W 24/10 |

FOREIGN PATENT DOCUMENTS

| CN | 103327613 A | 9/2013 |
| CN | 105472744 A | 4/2016 |
| CN | 105634990 A | 6/2016 |
| EP | 3445107 A1 | 2/2019 |
| RU | 2503153 C2 | 12/2013 |
| WO | 2015062690 A1 | 5/2015 |
| WO | 2015065110 A1 | 5/2015 |
| WO | 2018030825 A1 | 2/2018 |

OTHER PUBLICATIONS

Beijing Xinwei Telecom Techn., "Discussion on SA decoding and energy measurement," XP051090197, 3GPP TSG RAN WG1 Meeting #85, R1-164984, May 23-27, 2016, 3 pages.
Foreign Communication From a Counterpart Application, European Application No. 16912446.8, Extended European Search Report dated Dec. 11, 2018, 10 pages.
Machine Translation and Abstract of Chinese Publication No. CN101478792, Jul. 8, 2009, 12 pages.
Machine Translation and Abstract of Chinese Publication No. CN102083208, Jun. 1, 2011, 14 pages.
Machine Translation and Abstract of Chinese Publication No. CN103327613, Sep. 25, 2013, 10 pages.
Machine Translation and Abstract of Chinese Publication No. CN105634990, Jun. 1, 2016, 16 pages.
"3rd Generation Partnership Project; Technical Specification Group Radio Access Network; Evolved Universal Terrestrial Radio Access (E-UTRA); Multiplexing and channel coding (Release 13)," 3GPP TS 36.212, V13.2.0, Jun. 2016, 140 pages.
"3rd Generation Partnership Project; Technical Specification Group Radio Access Network; Evolved Universal Terrestrial Radio Access (E-UTRA); Medium Access Control (MAC) protocol specification (Release 13)," 3GPP TS 36.321, V13.2.0, Jun. 2016, 91 pages.
"3rd Generation Partnership Project; Technical Specification Group Radio Access Network; Evolved Universal Terrestrial Radio Access (E-UTRA); Radio Resource Control (RRC); Protocol specification (Release 13)," 3GPP TS 36.331, V13.2.0, Jun. 2016, 623 pages.

"3rd Generation Partnership Project; Technical Specification Group Radio Access Network; Evolved Universal Terrestrial Radio Access (E-UTRA); Physical layer procedures (Release 13)," 3GPP TS 36.213, V13.2.0, Part 1, Jun. 2016, 6 pages.
"3rd Generation Partnership Project; Technical Specification Group Radio Access Network; Evolved Universal Terrestrial Radio Access (E-UTRA); Physical layer procedures (Release 13)," 3GPP TS 36.213, V13.2.0, Part 2, Jun. 2016, 38 pages.
"3rd Generation Partnership Project; Technical Specification Group Radio Access Network; Evolved Universal Terrestrial Radio Access (E-UTRA); Physical layer procedures (Release 13)," 3GPP TS 36.213, V13.2.0, Part 3, Jun. 2016, 210 pages.
"3rd Generation Partnership Project; Technical Specification Group Radio Access Network; Evolved Universal Terrestrial Radio Access (E-UTRA); Physical layer procedures (Release 13)," 3GPP TS 36.213, V13.2.0, Part 4, Jun. 2016, 80 pages.
"3rd Generation Partnership Project; Technical Specification Group Radio Access Network; Evolved Universal Terrestrial Radio Access (E-UTRA); Physical layer procedures (Release 13)," 3GPP TS 36.213, V13.2.0, Part 5, Jun. 2016, 36 pages.
"3rd Generation Partnership Project; Technical Specification Group Radio Access Network; Evolved Universal Terrestrial Radio Access (E-UTRA); Physical layer procedures (Release 13)," 3GPP TS 36.213, V13.2.0, Part 6, Jun. 2016, 11 pages.
"3rd Generation Partnership Project; Technical Specification Group Radio Access Network; Evolved Universal Terrestrial Radio Access (E-UTRA); Physical channels and modulation (Release 13)," 3GPP TS 36.211, V13.2.0, Jun. 2016, 168 pages.
Foreign Communication From a Counterpart Application, PCT Application No. PCT/CN2016/095054, English Translation of International Search Report dated Apr. 27, 2017, 2 pages.
Sony, "Discussion on the transmitter UE behavior in resource selection/reselection" R1-164670, 3GPP TSG-RAN WG1#85, Nanjing, China, May 23-27, 2016, 4 pages.
ZTE, "Transmitter UE behavior in V2V," R1-164960, 3GPP TSG-RAN WG1#85, Nanjing, China, May 23-27, 2016, 7 pages.
Huawei, et al., "Discussion on group priority for D2D communication," R1-154339, 3GPP TSG-RAN WG1#82, Beijing, China, Aug. 24-28, 2015, 4 pages.
Foreign Communication From a Counterpart Application, Japanese Application No. 2018-535325, Japanese Office Action dated May 21, 2019, 3 pages.
Foreign Communication From a Counterpart Application, Japanese Application No. 2018-535325, English Translation of Japanese Office Action dated May 21, 2019, 3 pages.
NTT Docomo, Inc, "Further detail of partial sensing for P2V operation," 3GPP TSG RAN WG1 Meeting #85, R1-165208, May 23-27, 2016, 3 pages.
Foreign Communication From a Counterpart Application, Chinese Application No. 201680014826.0, Chinese Office Action dated Oct. 25, 2018, 4 pages.
Foreign Communication From a Counterpart Application, Chinese Application No. 201680014826.0, Chinese Search Report dated Oct. 16, 2018, 2 pages.
Foreign Communication From a Counterpart Application, Russian Application No. 2019106623, Russian Office Action dated Oct. 22, 2019, 7 pages.
Foreign Communication From a Counterpart Application, Russian Application No. 2019106623, English Translation of Russian Office Action dated Oct. 29, 2019, 2 pages.

* cited by examiner

RESOURCE SELECTION METHOD, APPARATUS, AND DEVICE

CROSS-REFERENCE TO RELATED APPLICATION

This application is a U.S. National Stage of International Patent Application No. PCT/CN2016/095054 filed on Aug. 12, 2016, which is hereby incorporated by reference in its entirety.

TECHNICAL FIELD

Embodiments of the present disclosure relate to communications technologies, and in particular, to a resource selection method, an apparatus, and a device.

BACKGROUND

According to a pedestrian-to-vehicle (P2V) communications technology, a wireless ad hoc communications network is formed by connecting user equipment (UE) to UE using an in-vehicle intelligent terminal device, thereby implementing mutual communication between UEs.

In other approaches, when UE performs sensing and semi-static reserved transmission in an autonomous resource selection mode, if resource selection or resource reselection is triggered, the UE needs to sense, in a sensing window, whether a resource is idle, and select, based on a sensing result, a time-frequency resource that is used to send data. In addition, the UE further indicates a resource reservation interval, that is, a time interval between a resource to be used for next data transmission and a resource used for current data transmission.

However, in a P2V service, because UE needs to continuously sense a status of a resource, and the UE may use different reservation intervals, the UE needs to perform sensing in a sensing window corresponding to each possible reservation interval. As a result, power consumption of UE is relatively high.

SUMMARY

Embodiments of the present disclosure provide a resource selection method, an apparatus, and a device in order to reduce power consumption of UE.

According to a first aspect, an embodiment of the present disclosure provides a resource selection method. The method is described from a perspective of first UE. The method includes determining, by the first UE, parameter information of a sensing window, where the parameter information includes at least one of a start time, a time span, or a quantity, sensing, by the first UE, the resource in the sensing window according to the parameter information of the sensing window, and selecting a resource according to a sensing result.

Because the parameter information of the sensing window is determined, and the resource is sensed in the sensing window according to the determined parameter information of the sensing window, a phenomenon that a resource is sensed according to a fixed sensing window is avoided, thereby reducing power consumption of UE.

In a possible design, determining, by the first UE, parameter information of a sensing window includes determining, by the first UE, the parameter information of the sensing window according to a usage status of a resource.

In a possible design, the usage status of the resource includes at least one of a first congestion level, a first resource reservation interval, a second resource reservation interval, a quantity of optional resources, or energy on the resource, and a resource reservation interval is a time interval between a resource used by second UE for current data transmission and a resource used by the second UE for next data transmission.

In this design, an optional resource is a resource that meets a specific criterion. For example, if the first UE learns that a resource is reserved or scheduled, and energy received on the resource exceeds a threshold, the resource is not an optional resource. In addition, the usage status of the resource may alternatively include power on the resource. When the first UE learns that the resource is reserved or scheduled, and the power received on the resource exceeds a threshold, the resource is not an optional resource.

The first UE may determine the parameter information of the sensing window according to the usage status of the resource such that the parameter information of the sensing window adaptively changes according to the usage status of the resource. Therefore, a relationship between power consumption and performance of UE is well balanced.

In a possible design, before determining, by the first UE, parameter information of a sensing window, the method includes receiving, by the first UE, first indication information sent by a base station or the second UE, where the first indication information includes the first congestion level and/or the first resource reservation interval, determining, by the first UE, the first congestion level according to the energy or the power on the resource, or receiving, by the first UE, second indication information sent by at least one second UE, where the second indication information includes a second congestion level and/or the second resource reservation interval, and determining, by the first UE, the first congestion level and/or the first resource reservation interval according to the second congestion level and/or the second resource reservation interval.

In this design, a congestion level may be represented as following. If energy on a resource is greater than a preset threshold, it indicates that the resource is busy, otherwise, the resource is idle, and within a period of time, a ratio of a quantity of all busy resources to a total quantity of resources is the congestion level. Therefore, a larger ratio represents a higher congestion level and a busier channel.

Because the first UE may obtain the usage status of the resource according to multiple different manners, manners of obtaining the usage status of the resource are simple and diversified.

In a possible design, the first resource reservation interval is a subset of the second resource reservation interval.

In a possible design, determining, by the first UE, the first resource reservation interval according to the second resource reservation interval includes sorting, by the first UE, the second resource reservation interval, and selecting, by the first UE from the sorted second resource reservation interval, M resource reservation intervals as the first resource reservation interval, where M is a positive integer.

In this design, after determining the second resource reservation interval, the first UE may determine the start time of the sensing window and the quantity of sensing windows according to the second resource reservation interval.

In a possible design, determining, by the first UE, parameter information of a sensing window includes receiving, by the first UE, third indication information, where the third indication information includes the parameter information of the sensing window.

The first UE may directly determine the parameter information of the sensing window using the received third indication information that includes the parameter information of the sensing window and that is sent by the base station or the second UE. This improves parameter information determining efficiency.

In a possible design, before determining, by the first UE, the parameter information of the sensing window according to a usage status of a resource, the method includes sensing, by the first UE, the resource in a preset time period, and determining the usage status of the resource.

In a possible design, if the usage status of the resource includes the quantity of optional resources, determining, by the first UE, the parameter information of the sensing window according to a usage status of a resource includes determining, by the first UE, that a time span of the sensing window is a sum of time spans of N preset time periods, where a quantity of optional resources in the N preset time periods is greater than or equal to the first preset threshold, or a sum of time spans of (N+1) preset time periods is greater than or equal to a second preset threshold, and N is a positive integer.

The first UE determines the time span of the sensing window according to the quantity of optional resources such that the time span of the sensing window changes according to the quantity of optional resources. Therefore, a relationship between power consumption and performance of UE can be well balanced.

In another possible design, if the usage status of the resource includes the quantity of optional resources, determining, by the first UE, the parameter information of the sensing window according to a usage status of a resource includes determining, by the first UE, that a time span of the sensing window is a difference between a sum of time spans of P preset time periods and a sum of time spans of L preset time periods in which there is no optional resource, where a quantity of optional resources in the P preset time periods is greater than or equal to a third preset threshold, or a sum of time spans of (P+1) preset time periods is greater than or equal to a fourth preset threshold, and both P and L are positive integers.

The first UE determines the time span of the sensing window according to a quantity of optional resources obtained in a preset time such that the time span of the sensing window changes according to the quantity of optional resources. Therefore, a relationship between power consumption and performance of UE can be well balanced.

In another possible design, if the usage status of the resource includes the quantity of optional resources, determining, by the first UE, the parameter information of the sensing window according to a usage status of a resource includes determining that a time span of the sensing window is a time span of a first time period, where in the preset time period, a quantity of optional resources in the first time period is largest, and the preset time period includes at least one first time period, or determining that a time span of the sensing window is a time span of a second time period, where in the preset time period, a quantity of optional resources in the second time period is greater than or equal to a fifth preset threshold, and the time span of the second time period is less than a time span of another second time period in the preset time period, and the preset time period includes at least one second time period.

The first UE determines the time span of the sensing window according to a quantity of optional resources obtained in a preset time such that the time span of the sensing window changes according to the quantity of optional resources. Therefore, a relationship between power consumption and performance of UE can be well balanced.

In a possible design, determining, by the first UE, parameter information of a sensing window includes determining, by the first UE, an offset of the start time of the sensing window, and determining, by the first UE, the start time of the sensing window according to the offset and a start time of a sensing window that is used during previous sensing.

In a possible design, the offset is related to a time span of the sensing window that is used during the previous sensing.

Because a start time of a sensing window of the UE has an offset, a phenomenon that the UE cannot find sufficient optional resources in a sensing window can be prevented.

According to a second aspect, an embodiment of the present disclosure provides UE, including a processor configured to determine parameter information of a sensing window, where the parameter information includes at least one of a start time, a time span, or a quantity, and the processor is further configured to sense the resource in the sensing window according to the parameter information of the sensing window, and select a resource according to a sensing result.

In a possible design, the processor is further configured to determine the parameter information of the sensing window according to a usage status of a resource.

In a possible design, the usage status of the resource includes at least one of a first congestion level, a first resource reservation interval, a second resource reservation interval, a quantity of optional resources, or energy on the resource, and a resource reservation interval is a time interval between a resource used by second UE for current data transmission and a resource used by the second UE for next data transmission.

In a possible design, the UE further includes a receiver, where the receiver is configured to receive first indication information sent by a base station or the second UE, where the first indication information includes the first congestion level and/or the first resource reservation interval, the processor is further configured to determine the first congestion level according to the energy on the resource, or the receiver is configured to receive second indication information sent by at least one second UE, where the second indication information includes a second congestion level and/or the second resource reservation interval, and the processor is further configured to determine the first congestion level and/or the first resource reservation interval according to the second congestion level and/or the second resource reservation interval.

In a possible design, the first resource reservation interval is a subset of the second resource reservation interval.

In a possible design, the processor is further configured to sort the second resource reservation interval, and select, from the sorted second resource reservation interval, M resource reservation intervals as the first resource reservation interval, where M is a positive integer.

In a possible design, the UE further includes a receiver, where the receiver is configured to receive third indication information, where the third indication information includes the parameter information of the sensing window.

In a possible design, the processor is further configured to sense the resource in a preset time period and determine the usage status of the resource.

In a possible design, if the usage status of the resource includes the quantity of optional resources, the processor is further configured to determine that a time span of the sensing window is a sum of time spans of N preset time periods, where a quantity of optional resources in the N preset time period is greater than or equal to the first preset threshold, or a sum of time spans of (N+1) preset time periods is greater than or equal to a second preset threshold, and N is a positive integer.

In a possible design, if the usage status of the resource includes the quantity of optional resources, the processor is further configured to determine that a time span of the sensing window is a time span of a first time period, where in the preset time period, a quantity of optional resources in the first time period is largest, and the preset time period includes at least one first time period, or the processor is further configured to determine that a time span of the sensing window is a time span of a second time period, where in the preset time period, a quantity of optional resources in the second time period is greater than or equal to a fifth preset threshold, and the time span of the second time period is less than a time span of another second time period in the preset time period, and the preset time period includes at least one second time period.

In a possible design, the processor is further configured to determine an offset of the start time of the sensing window, and the processor is further configured to determine the start time of the sensing window according to the offset and a start time of a sensing window that is used during previous sensing.

In a possible design, the offset is related to a time span of the sensing window that is used during the previous sensing.

According to the resource selection method, the apparatus, and the device provided in the embodiments of the present disclosure, the parameter information of the sensing window is determined, and the resource is sensed in the sensing window according to the parameter information of the sensing window in order to perform resource selection. Because the parameter information of the sensing window is determined, and the resource is sensed in the sensing window according to the determined parameter information of the sensing window, a phenomenon that a resource is sensed according to a fixed sensing window is avoided, thereby reducing power consumption of UE.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

Figure 1:
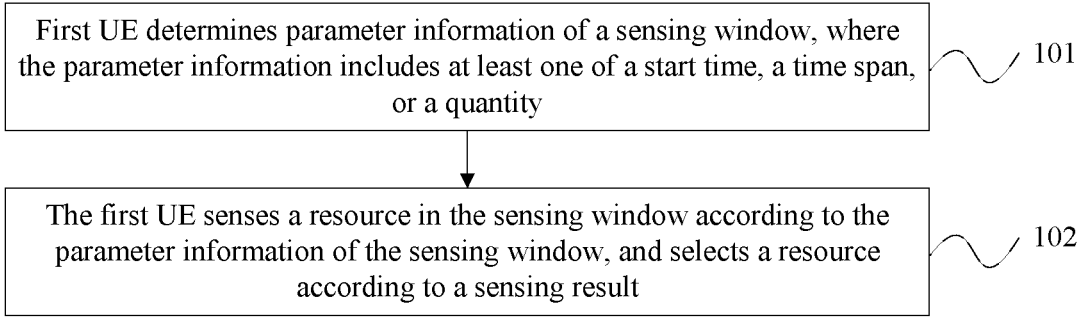
FIG. 1 is a schematic flowchart of Embodiment 1 of a resource selection method according to the present disclosure.

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

For ease of understanding, the following first describes a resource selection manner in a vehicle to vehicle (V2V) service.

Currently, a solution in which UE performs sensing and semi-static reserved transmission in an autonomous resource selection mode is defined in a V2V work item (WI). In the autonomous resource selection mode used by the UE, if resource selection or resource reselection is triggered at a moment n, the UE senses a resource at least from a moment (n−a) to a moment (n−b). That is, a start time of a sensing window is at (n−a), and a time span thereof is (a−b), where values of a and b are constant, and the sensing window is relative to a reference moment n. The reference moment n may be the moment at which resource selection or resource reselection is triggered, a moment at which the first packet arrives at a Packet Data Convergence Protocol (PDCP) layer after resource selection or resource reselection is triggered, or another moment that may be used for reference. The start time of the sensing window is relative to a reference moment of current sensing. Sensing needs to be performed once each time resource selection or resource reselection is performed.

Based on a result obtained by means of sensing in the sensing window, the UE selects to send data on a frequency resource block at a moment (n+d). In addition, the UE sends a scheduling assignment (SA) at a moment (n+c). The SA indicates the related data transmitted at the moment (n+d), and the SA further indicates whether data is to be sent at a moment (n+e) by still using the frequency resource, where e may include multiple values. For ease of description, a time interval that is indicated by the UE and that is between a resource to be used for next data transmission and a resource used for current data transmission is defined as a resource reservation interval. When the UE reserves a group of periodic resources, a resource reservation interval is a time interval between two resources.

However, in a P2V service, if a resource is selected in a sensing-based manner used in V2V, when a sensing time of UE is longer, power consumption of the UE is higher. However, if a sensing time of UE is shorter, fewer resources are available. As a result, the UE does not find an appropriate resource from limited available resources. In addition, because the UE may use different reservation intervals, for example, 100 milliseconds (ms), 200 ms, . . . , 1000 ms, if UE sends data using a resource at (n−1000) ms, and instructs to reserve the resource after a moment corresponding to 1000 ms, the resource at n ms is reserved. If UE sends data using a resource at (n−100), and instructs to reserve the resource after a moment corresponding to 100 ms, the resource at n ms is reserved. If the UE sends data by selecting a resource at n ms, the UE needs to sense the resource at least at (n−1000) ms and (n−100) ms. That is, the UE needs to perform sensing at a time corresponding to each resource reservation interval. Assuming that a resource reservation interval of another UE may be 100 ms, 200 ms, or 500 ms, if UE sends data by selecting a resource from (n+1) ms to (n+10) ms, the UE needs to sense the resource in a sensing window from (n−499) ms to (n−490) ms, a sensing window from (n−199) ms to (n−190) ms, or a sensing window from (n−99) ms to (n−90) ms. Therefore, there may be multiple sensing windows during one sensing by the UE. The UE performs sensing in a sensing window corresponding to each possible reservation interval. As a result, power consumption of the UE is relatively high.

FIG. 1 is a schematic flowchart of Embodiment 1 of a resource selection method according to the present disclosure. This embodiment of the present disclosure provides a resource selection method, and this embodiment is executed by UE. As shown in FIG. 1, the method in this embodiment may include the following steps.

Step 101. First UE determines parameter information of a sensing window, where the parameter information includes at least one of a start time, a time span, or a quantity.

In this embodiment, in a P2V service, the first UE first needs to determine the parameter information of the sensing window. The parameter information includes at least one of the start time, the time span, or the quantity, and the sensing window may be a time period. For example, assuming that a reference moment of one sensing is n ms, the first UE may sense a resource in a sensing window whose start time is at (n−100) ms and time span is 10 ms.

Step 102. The first UE senses the resource in the sensing window according to the parameter information of the sensing window, and selects a resource according to a sensing result.

In this embodiment, after determining the parameter information of the sensing window, the first UE senses the resource in the sensing window, and learns energy on the resource or whether the resource is reserved or scheduled, thereby learning which resources are idle and which resources are busy in order to select a resource to send data.

According to the resource selection method provided in this embodiment of the present disclosure, the parameter information of the sensing window is determined, the resource is sensed in the sensing window according to the parameter information of the sensing window, and the resource is selected according to the sensing result. Because the parameter information of the sensing window is determined, and the resource is sensed in the sensing window according to the determined parameter information of the sensing window, a phenomenon that a resource is sensed according to a fixed sensing window is avoided, thereby reducing power consumption of UE.

Figure 2:
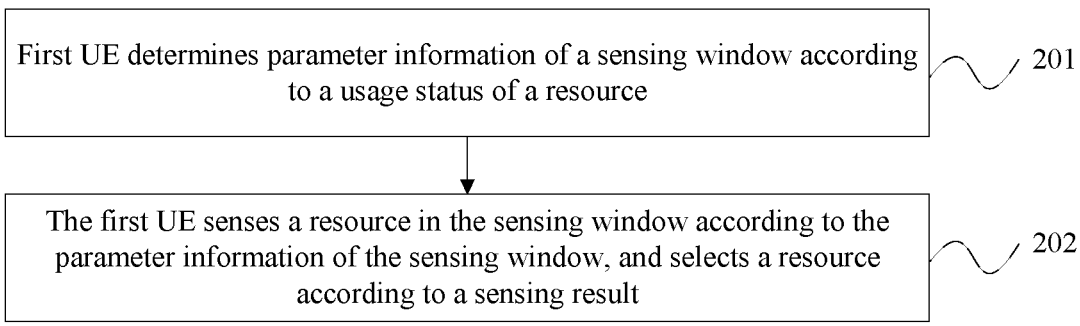
FIG. 2 is a schematic flowchart of Embodiment 2 of a resource selection method according to the present disclosure.

FIG. 2 is a schematic flowchart of Embodiment 2 of a resource selection method according to the present disclosure. Based on Embodiment 1 of the resource selection method, this embodiment provides detailed description of an embodiment in which first UE determines parameter information of a sensing window. As shown in FIG. 2, the method in this embodiment may include the following steps.

Step 201. The first UE determines the parameter information of the sensing window according to a usage status of a resource.

In this embodiment, the usage status of the resource includes at least one of a first congestion level, a first resource reservation interval, a second resource reservation interval, a quantity of optional resources, or energy on the resource. The first resource reservation interval is a time interval between a resource used by second UE for current data transmission and a resource used by the second UE for next data transmission. In addition, an optional resource is a resource that meets a specific criterion. For example, if the first UE learns, according to a decoded SA, that a resource is reserved or scheduled, and energy received on the resource exceeds a threshold, the resource is not an optional resource. Otherwise, the resource is an optional resource. In addition, the usage status of the resource may alternatively include power on the resource.

Step 202. The first UE senses the resource in the sensing window according to the parameter information of the sensing window, and selects a resource according to a sensing result.

According to the resource selection method provided in this embodiment of the present disclosure, the parameter information of the sensing window is determined, the resource is sensed in the sensing window according to the parameter information of the sensing window, and the resource is selected according to the sensing result. Because the parameter information of the sensing window is determined, and the resource is sensed in the sensing window according to the determined parameter information of the sensing window, a phenomenon that a resource is sensed according to a fixed sensing window is avoided, thereby reducing power consumption of UE. In addition, the first UE may determine the parameter information of the sensing window according to the usage status of the resource such that the parameter information of the sensing window adaptively changes according to the usage status of the resource. Therefore, a relationship between power consumption and performance of UE is well balanced.

Optionally, before determining the parameter information of the sensing window, the first UE determines the first congestion level according to the energy on the resource.

Further, a congestion level may be represented as following. If energy on a resource is greater than a preset threshold, it indicates that the resource is busy, otherwise, the resource is idle, and within a period of time, a ratio of a quantity of all busy resources to a total quantity of resources is the congestion level. Therefore, a larger ratio represents a higher congestion level and a busier channel. Based on the foregoing representation, the first UE may determine the first congestion level according to the energy on the resource.

It should be noted that the congestion level may be alternatively defined in another manner. For example, a congestion level is a ratio of an average value of energy on all resources within a period of time to a preset threshold. A definition manner of the congestion level is not limited herein in this embodiment. The preset threshold may be preconfigured, may be configured using a network, may be predefined, or the like. A specific preset threshold is not limited herein in this embodiment. In addition, the congestion level may be represented by resource utilization.

The first UE may determine the first congestion level according to energy on a resource in a sensing window that is used during previous one or more times of sensing.

The following further describes how the first UE determines the first congestion level, the first resource reservation interval, and the second resource reservation interval before determining the parameter information of the sensing window.

Optionally, before determining the parameter information of the sensing window, the first UE receives first indication information sent by a base station or the second UE. The first indication information includes the first congestion level and/or the first resource reservation interval.

Further, the first UE may also obtain the first congestion level and/or the first resource reservation interval using the received first indication information that includes the first congestion level and/or the first resource reservation interval and that is sent by the base station or the second UE. The first congestion level and/or the first resource reservation interval includes only the first congestion level, includes only the first resource reservation interval, or includes both the first congestion level and the first resource reservation interval. In actual application, a manner of determining the first congestion level by the base station or the second UE is as follows. The base station or the second UE may determine the first congestion level using a received second congestion level sent by at least one another UE and using an algorithm such as an average algorithm. There are multiple methods for determining the first resource reservation interval by the base station or the second UE. A first method is determining the first resource reservation interval according to the second resource reservation interval.

Further, the base station or the second UE determines a set of resource reservation intervals using a received resource reservation interval sent by the at least one another UE, and uses the set as the second resource reservation interval. In a specific implementation process, a method for determining the second resource reservation interval is as follows. When the base station or the second UE receives a resource reservation interval that is not in the set, the resource reservation interval is added to the set. For a resource reservation interval in the set, if the base station or the second UE does not receive the resource reservation interval during continuous Y times of sensing, the resource reservation interval is deleted from the set. Another method for determining the second resource reservation interval is as follows. After receiving a message that includes a resource reservation interval and that is sent by another UE, the base station or the second UE determines a set of resource reservation intervals according to the message, and sends the set to the base station or the second UE, and in this case, the base station or the second UE may determine the second resource reservation interval according to the set.

After determining the second resource reservation interval, the base station or the second UE may directly use the second resource reservation interval as the first resource reservation interval.

A second method for determining the first resource reservation interval by the base station or the second UE is sorting the second resource reservation interval and determining the first resource reservation interval according to the sorted second resource reservation interval. Further, the base station or the second UE receives a resource reservation interval sent by at least one another UE, and determines the resource reservation interval as the second resource reservation interval. The second resource reservation interval is sorted, and M resource reservation intervals are selected from the sorted second resource reservation interval and used as the first reservation interval, where M is a positive integer. The first resource reservation interval is a subset of the second resource reservation interval. In actual application, a sorting manner is sorting according to a quantity of received second resource reservation intervals. For example, if a set of second resource reservation intervals determined by the base station or the second UE is A, for example, A is {100 ms, 200 ms, 500 ms, 1000 ms}, a quantity of resource reservation intervals of 100 ms that are received by the base station or the second UE is 2, a quantity of resource reservation intervals of 200 ms that are received by the base station or the second UE is 5, a quantity of resource reservation intervals of 500 ms that are received by the base station or the second UE is 3, and a quantity of resource reservation intervals of 1000 ms that are received by the base station or the second UE is 1, the set of sorted second resource reservation intervals is {200 ms, 500 ms, 100 ms, 1000 ms}. Another sorting manner is sorting according to a sum of energy within a received second resource reservation interval. Energy within a resource reservation interval may be energy of an SA that indicates the resource reservation interval, or energy of a demodulation reference signal (DMRS) of a data signal that is transmitted by scheduling using an SA that indicates the resource reservation interval. Certainly, another manner may be used to sort the second resource reservation interval. A specific sorting manner is not limited herein in this embodiment.

After the base station or the second UE sorts the second resource reservation interval, the first M resource reservation intervals may be selected from the second resource reservation interval and used as the first resource reservation interval. Selection may be performed according to a quantity of resource reservation intervals or a sum of energy within the resource reservation intervals. For example, the first M reservation intervals may be selected, and a quantity of the M reservation intervals or a sum of energy within the M reservation intervals exceeds X % of a quantity of or energy within total second resource reservation intervals. M and X may be preconfigured, may be configured using a network, may be predefined, or may be determined by UE or a base station according to a congestion level.

A third method for determining the first resource reservation interval by the base station or the second UE is as follows. After determining the second resource reservation interval according to a manner of determining the second resource reservation interval in the first method, the base station or the second UE then sorts the second resource reservation interval according to the second method, and determines the first resource reservation interval according to the sorted second resource reservation interval.

A fourth method for determining the first resource reservation interval by the base station or the second UE is as follows. The base station or the second UE uses a received resource reservation interval sent by at least one another UE as the first resource reservation interval.

It should be noted that, for the first resource reservation interval determined according to the foregoing several methods, each resource reservation interval corresponds to a sensing window.

In addition, the first resource reservation interval that is included in the first indication information and that is sent by the second UE may be a resource reservation interval of the second UE, that is, a resource reservation interval sent after being added to the SA, or may be a resource reservation interval determined using a received resource reservation interval of another UE and using the foregoing method.

The first resource reservation interval that is included in the first indication information and that is sent by the base station may be a resource reservation interval determined using a received resource reservation interval of another UE and using the foregoing method.

After determining the first congestion level and/or the first resource reservation interval, the base station or the second UE adds the first congestion level and/or the first resource reservation interval to the first indication information and sends the first indication information to the first UE. The base station may alternatively determine the first congestion level and/or the first resource reservation interval using another algorithm. A specific determining manner is not limited herein in this embodiment.

Optionally, before determining the parameter information of the sensing window, the first UE receives second indication information sent by a base station or at least one second UE, where the second indication information includes a second congestion level and/or the second resource reservation interval, and the first UE determines the first congestion level and/or the first resource reservation interval according to the second congestion level and/or the second resource reservation interval.

Further, after receiving the second congestion level and/or the second resource reservation interval sent by the at least one second UE, the first UE determines the first congestion level and/or the first resource reservation interval using a method the same as that used by the base station or the second UE. For a method for determining the first congestion level and/or the first resource reservation interval by the first UE, details are not described herein again. In addition, the second congestion level may be the same as or be different from the first congestion level.

In addition, the first UE may determine the first resource reservation interval and the second resource reservation interval according to a resource reservation interval in a sensing window that is used during previous one or more times of sensing.

Based on the foregoing embodiment, this embodiment provides detailed description about how the first UE determines the parameter information of the sensing window after determining the first congestion level, the first resource reservation interval, and the second resource reservation interval.

Optionally, if the usage status of the resource includes the first congestion level, that the first UE determines the parameter information of the sensing window according to a usage status of a resource includes that the first UE determines a time span of the sensing window according to a correspondence between the first congestion level and the time span of the sensing window.

In this embodiment, time spans of several sensing windows may be preset, and the correspondence between the first congestion level and the time span of the sensing window is predefined. A higher congestion level indicates a longer time span, and a lower congestion level indicates a shorter time span. Persons skilled in the art can understand that, when the first congestion level is less than a preset threshold or greater than another preset threshold, the time span of the sensing window may be set to zero. That is, the first UE does not perform sensing when selecting a resource, and may randomly select a resource. The time span of the sensing window, the correspondence between the first congestion level and the time span of the sensing window, and the preset threshold may be set according to experience or an actual situation. A specific time span, a correspondence, and a preset threshold are not limited herein in this embodiment.

Optionally, if the usage status of the resource includes the first congestion level and the second resource reservation interval, that the first UE determines the parameter information of the sensing window according to a usage status of a resource includes determining a start time of a sensing window and a quantity of sensing windows according to the second resource reservation interval.

In this embodiment, after determining the second resource reservation interval, the first UE may determine the start time of the sensing window and the quantity of sensing windows according to the second resource reservation interval. In a specific implementation, after determining the first congestion level of the resource, the first UE determines the start time of the sensing window and the quantity of sensing windows according to the first congestion level and the second resource reservation interval. For example, the second resource reservation interval determined by the first UE is A, and A is {100 ms, 200 ms, 500 ms, 1000 ms}. When the first congestion level is relatively high, one of every two elements in the set is selected, and it may be determined that a set of time spans of sensing windows is {100 ms, 500 ms}, that is, a start time of a sensing window and a quantity of sensing windows may be determined. When the first congestion level is relatively low, one of every four elements in the set is selected, it may be determined that a time span of a sensing window is {100 ms}, and therefore, a start time of a sensing window and a quantity of sensing windows may be determined.

Optionally, if the usage status of the resource includes the first resource reservation interval, that the first UE determines the parameter information of the sensing window according to a usage status of a resource includes determining a start time of a sensing window and a quantity of sensing windows according to the first resource reservation interval.

In this embodiment, a start time of a sensing window and a quantity of sensing windows may be determined according to a reference moment of current sensing and the first resource reservation interval. For example, the reference moment of current sensing is n ms. Assuming that the first resource reservation interval includes 100 ms, a start time of a sensing window is at (n−100) ms, or assuming that the first resource reservation interval further includes 500 ms, a start time of another sensing window is at (n−500) ms, and a quantity of sensing windows is 2.

Optionally, if the usage status of the resource includes the first resource reservation interval, that the first UE determines the parameter information of the sensing window according to a usage status of a resource includes determining a time span of the sensing window according to the first resource reservation interval.

In this embodiment, the time span of the sensing window is related to a maximum resource reservation interval in the first resource reservation interval. For example, the time span of the sensing window may be equal to the maximum resource reservation interval in the first resource reservation interval.

According to the resource selection method provided in this embodiment of the present disclosure, the parameter information of the sensing window is determined, the resource is sensed in the sensing window according to the parameter information of the sensing window, and the resource is selected according to the sensing result. Because the parameter information of the sensing window is determined, and the resource is sensed in the sensing window according to the determined parameter information of the sensing window, a phenomenon that a resource is sensed according to a fixed sensing window is avoided, thereby reducing power consumption of UE. In addition, the first UE determines the parameter information of the sensing window according to the usage status of the resource such that the parameter information of the sensing window changes according to the usage status of the resource. Therefore, a relationship between power consumption and performance of UE is well balanced.

Optionally, assuming that a preset period is N times of sensing, the first UE may periodically use a relatively large quantity of sensing windows, and determine, based on a result of current sensing, a relatively small quantity of sensing windows that are used during following (N−1) times of sensing. For example, assuming that a period is five times of sensing, when the first UE performs sensing for the first time, and assuming that a reference moment of current sensing is n ms and a time span of a sensing window is 10 ms, UE senses a resource in a sensing window from (n−100) ms to (n−91) ms, a sensing window from (n−200) ms to (n−191) ms, a sensing window from (n−300) ms to (n−291) ms, a sensing window from (n−400) ms to (n−391) ms, a sensing window from (n−500) ms to (n−491) ms, a sensing window from (n−600) ms to (n−591) ms, a sensing window from (n−700) ms to (n−691) ms, a sensing window from (n−800) ms to (n−791) ms, a sensing window from (n−900) ms to (n−891) ms, and a sensing window from (n−1000) ms to (n−991) ms, and first resource reservation intervals received in these sensing windows are {100 ms, 200 ms, 500 ms}. Assuming that when the first UE performs sensing for the second, third, fourth, and fifth times, a reference moment for sensing is n' ms, the UE senses a resource in a sensing window from (n'−100) ms to (n'−91) ms, a sensing window from (n'−200) ms to (n'−191) m, and a sensing window from (n'−500) ms to (n'−491) m, and a quantity of sensing windows during each sensing is 3. A quantity of sensing windows used during the sixth time of sensing by the first UE is the same as a quantity of sensing windows used during the first time of sensing. Quantities of sensing windows used during the seventh, eighth, ninth, and tenth times of sensing are related to resource reservation intervals determined during the sixth time of sensing.

Optionally, that the first UE determines the parameter information of the sensing window includes that the first UE receives indication information, where the indication information includes the parameter information of the sensing window.

Further, the first UE may alternatively determine the parameter information of the sensing window using received third indication information that includes the parameter information of the sensing window and that is sent by a base station or the second UE. A manner of determining the parameter information of the sensing window by the base station or the second UE is similar to the manner of determining the parameter information of the sensing window by the first UE, and details are not described herein again.

Figure 3:
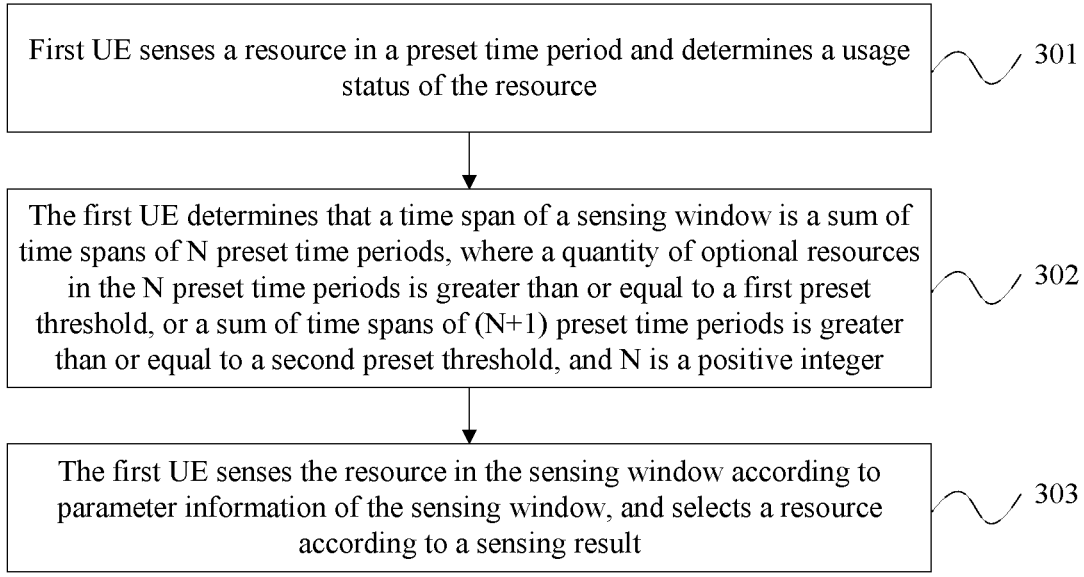
FIG. 3 is a schematic flowchart of Embodiment 3 of a resource selection method according to the present disclosure.

FIG. 3 is a schematic flowchart of Embodiment 3 of a resource selection method according to the present disclosure. Based on Embodiment 1 of the resource selection method, this embodiment provides detailed description of an embodiment in which first UE determines parameter information of a sensing window. As shown in FIG. 3, the method in this embodiment may include the following steps.

Step 301. The first UE senses a resource in a preset time period and determines a usage status of the resource.

In this embodiment, the preset time period may be set according to experience or an actual situation. For example, the preset time period may be 10 ms, 20 ms, or the like. Alternatively, the preset time period may be a time span of a sensing window that is used during one sensing. A specific preset time period is not limited herein in this embodiment. The usage status of the resource includes a quantity of optional resources.

Step 302. The first UE determines that a time span of the sensing window is a sum of time spans of N preset time periods, where a quantity of optional resources in the N preset time periods is greater than or equal to a first preset threshold, or a sum of time spans of (N+1) preset time periods is greater than or equal to a second preset threshold, and N is a positive integer.

In this embodiment, if N is 1, that is, in one preset time period, a quantity of optional resources obtained by sensing by the first UE is greater than or equal to the first preset threshold, the preset time period is directly used as the time span of the sensing window. For example, assuming that the preset time period is 10 ms and the first preset threshold is 20, and if a quantity of optional resources that are found by the first UE in 10 ms is 21, 10 ms may be used as the time span of the sensing window.

If N is greater than 1, and a quantity of optional resources obtained by sensing by the first UE is less than the first preset threshold in a preset time period, the first UE may continue to sense optional resources in a next preset time period, determine whether a quantity of optional resources is greater than or equal to the first preset threshold in the two preset time periods, if the quantity of optional resources is greater than or equal to the first preset threshold in the two preset time periods, set a sum of time spans of the two preset time periods as the time span of the sensing window, otherwise, continue to perform sensing, until a quantity of optional resources is greater than or equal to the first preset threshold when sensing is performed within time spans of a total of N preset time periods, or the sum of the time spans of the (N+1) preset time periods is greater than or equal to the second preset threshold, and set the sum of the time spans of the N preset time periods as the time span of the sensing window. The preset time period, the first preset threshold, and the second preset threshold may be preconfigured, may be configured using a network, may be predefined, or the like. A specific preset time period, a specific first preset threshold, and a specific second preset threshold are not limited herein in this embodiment.

For example, assuming that a span of the preset time period is 10 ms, when a quantity of optional resources found by performing sensing by the first UE in a sensing window (for example, a corresponding resource reservation interval thereof is 500 ms) from (n−a) ms to (n−a+9) ms is less than the first preset threshold, the first UE continues to perform sensing from (n−a+10) ms to (n−a+19) ms. In this case, a quantity of optional resources that are founded by the first UE is greater than or equal to the first preset threshold, and the first UE stops sensing. The first UE determines that a time span of the sensing window is 20 ms. Optionally, when the first UE performs sensing in a next sensing window (for example, a corresponding resource reservation interval thereof is 200 ms) that is used during current sensing, a time span of the sensing window is 20 ms, and a start time of the sensing window is at (n−a+300) ms.

Step 303. The first UE senses the resource in the sensing window according to the parameter information of the sensing window, and selects a resource according to a sensing result.

According to the resource selection method provided in this embodiment of the present disclosure, the parameter information of the sensing window is determined, and the resource is sensed in the sensing window according to the parameter information of the sensing window in order to perform resource selection. Because the parameter information of the sensing window is determined, and the resource is sensed in the sensing window according to the determined parameter information of the sensing window, a phenomenon that a resource is sensed according to a fixed sensing window is avoided, thereby reducing power consumption of UE. In addition, the first UE determines the time span of the sensing window according to the quantity of optional resources such that the time span of the sensing window changes according to the quantity of optional resources. Therefore, a relationship between power consumption and performance of UE can be well balanced.

Figure 4:
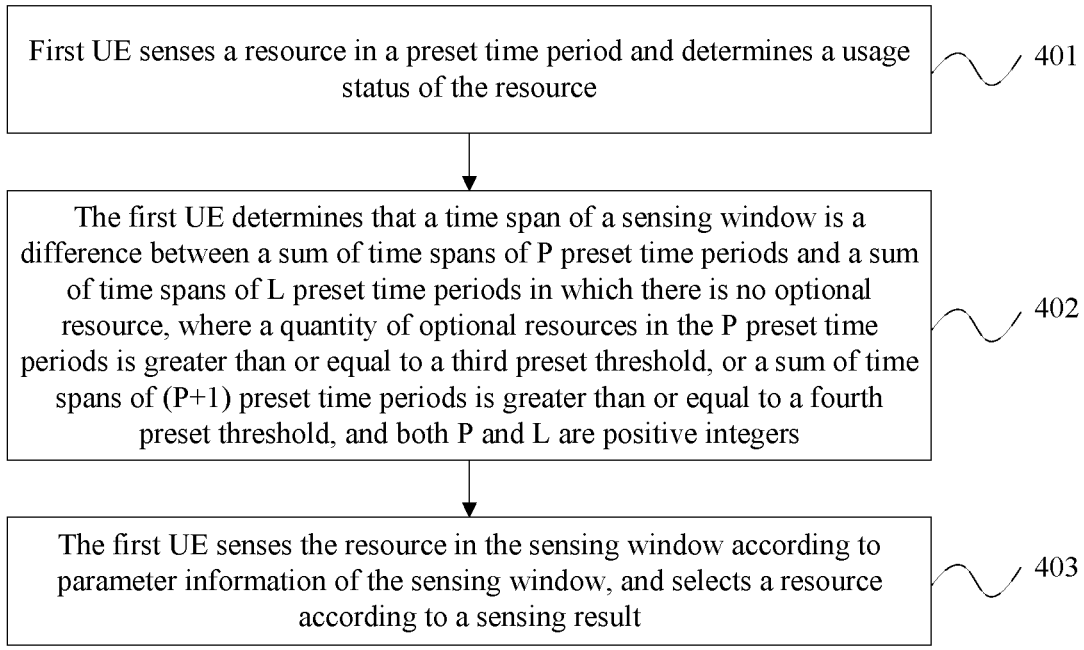
FIG. 4 is a schematic flowchart of Embodiment 4 of a resource selection method according to the present disclosure.

FIG. 4 is a schematic flowchart of Embodiment 4 of a resource selection method according to the present disclosure. Based on Embodiment 1 of the resource selection method, this embodiment provides detailed description of an embodiment in which first UE determines parameter information of a sensing window. As shown in FIG. 4, the method in this embodiment may include the following steps.

Step 401. The first UE senses a resource in a preset time period and determines a usage status of the resource.

The usage status of the resource includes a quantity of optional resources.

Step 402. The first UE determines that a time span of the sensing window is a difference between a sum of time spans of P preset time periods and a sum of time spans of L preset time periods in which there is no optional resource, where a quantity of optional resources in the P preset time periods is greater than or equal to a third preset threshold, or a sum of time spans of (P+1) preset time periods is greater than or equal to a fourth preset threshold, and both P and L are positive integers.

In this embodiment, if a quantity of optional resources that are obtained by sensing by the first UE is less than the third preset threshold in a first preset time period, the first UE may continue to sense optional resources in a next preset time period, determine whether a quantity of optional resources is greater than or equal to the third preset threshold in the two preset time periods, if the quantity of optional resources is greater than or equal to the third preset threshold in the two preset time periods, the first UE needs to determine a time span of a preset time period in which there is no optional resource, and set a difference between a sum of time spans of the two preset time periods and the time span of the preset time period in which there is no optional resource as the time span of the sensing window. Otherwise, the first UE continues to perform sensing, until a quantity of optional resources is greater than or equal to the third preset threshold when sensing is performed within the time spans of a total of P preset time periods. Alternatively, when the sum of the time spans of the (P+1) preset time periods is greater than or equal to the fourth preset threshold, the first UE first needs to determine the time spans of the L preset time periods in which there is no optional resource, and set the difference between the sum of the time spans of the P preset time periods and the sum of the time spans of the L preset time periods in which there is no optional resource as the time span of the sensing window. For example, assuming that a span of the preset time period is 10 ms, when a quantity of optional resources found by performing sensing by the first UE in a sensing window (for example, a corresponding resource reservation interval thereof is 500 ms) from (n−a) ms to (n−a+9) ms is less than the third preset threshold, the first UE continues to perform sensing from (n−a+10) ms to (n−a+19) ms. In this case, a quantity of optional resources that are founded by the UE is greater than or equal to the fourth preset threshold, and the UE stops sensing. In addition, the first UE finds that there is no optional resource in a time period from (n−a) ms to (n−a+9) ms, and when the UE performs sending in a next sensing window (for example, a corresponding resource reservation interval thereof is 200 ms), a start time of the sensing window is at (n−a+310) ms.

Step 403. The first UE senses the resource in the sensing window according to the parameter information of the sensing window, and selects a resource according to a sensing result.

According to the resource selection method provided in this embodiment of the present disclosure, the parameter information of the sensing window is determined, and the resource is sensed in the sensing window according to the parameter information of the sensing window in order to perform resource selection. Because the parameter information of the sensing window is determined, and the resource is sensed in the sensing window according to the determined parameter information of the sensing window, a phenomenon that a resource is sensed according to a fixed sensing window is avoided, thereby reducing power consumption of UE. In addition, the first UE determines the time span of the sensing window according to a quantity of optional resources obtained in a preset time period such that the time span of the sensing window changes according to the quantity of optional resources. Therefore, a relationship between power consumption and performance of UE can be well balanced.

Figure 5:
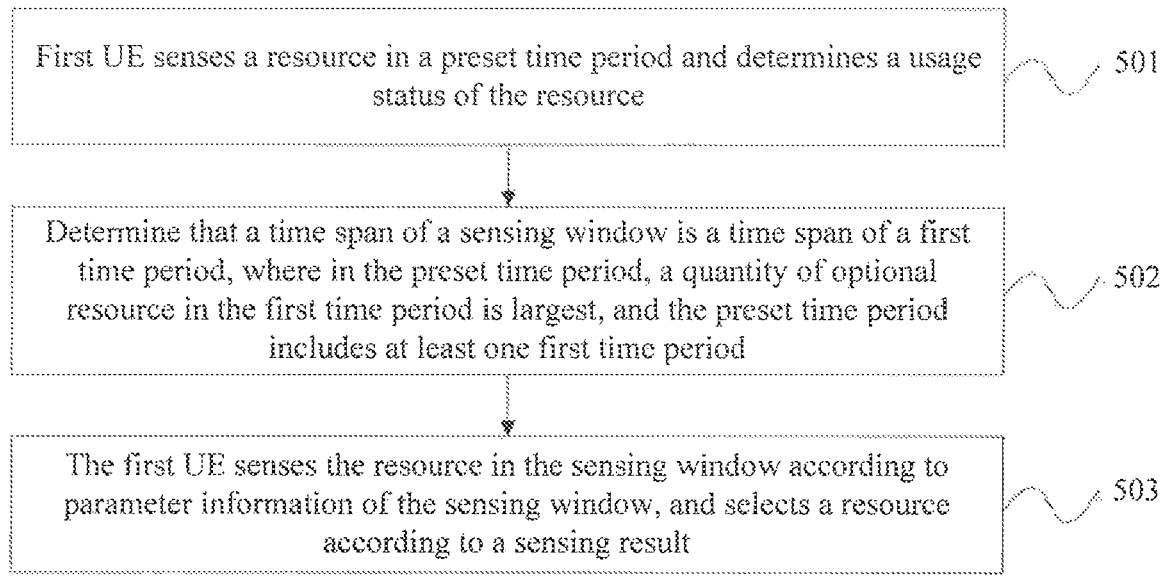
FIG. 5 is a schematic flowchart of Embodiment 5 of a resource selection method according to the present disclosure.

FIG. 5 is a schematic flowchart of Embodiment 5 of a resource selection method according to the present disclosure. Based on Embodiment 1 of the resource selection method, this embodiment provides detailed description of an embodiment in which first UE determines parameter information of a sensing window. As shown in FIG. 5, the method in this embodiment may include the following steps.

Step 501. The first UE senses a resource in a preset time period and determines a usage status of the resource.

The usage status of the resource includes a quantity of optional resources.

Step 502. Determine that a time span of the sensing window is a time span of a first time period, where in the preset time period, a quantity of optional resources in the first time period is largest, and the preset time period includes at least one first time period.

In this embodiment, after obtaining the quantity of optional resources in the preset time period, the first UE determines the first time period in which the quantity of optional resource is largest in the preset time period, determines the time span of the first time period as the time span of the sensing window, and determines a start time of the sensing window according to the first time period. For example, a sensing window during the $N^{th}$ time of sensing by the first UE is from (n−1000) ms to (n−1) ms, where n ms is a reference moment of current sensing. Assuming that the time span of the first time period is 10 ms, after obtaining a quantity of optional resources from (n−1000) ms to (n−1) ms, the first UE finds that a quantity of optional resources from (n−110) ms to (n−101) ms is largest. Assuming that (n+m) ms is a reference moment of the $(N+M)^{th}$ time of sensing by the first UE, a sensing window during current sensing is from (n+m−110) ms to (n+m−101) ms.

Optionally, to resolve a problem that the resource selected in the foregoing manner cannot continue to be used for data transmission after a period of time, the UE may use the preset time period during the first time of sensing, use the first time period during the subsequent $(N-1)^{th}$ time of sensing, and use the preset time period again during the $(N+1)^{th}$ time of sensing.

Step 503. The first UE senses the resource in the sensing window according to the parameter information of the sensing window, and selects a resource according to a sensing result.

According to the resource selection method provided in this embodiment of the present disclosure, the parameter information of the sensing window is determined, and the resource is sensed in the sensing window according to the parameter information of the sensing window in order to perform resource selection. Because the parameter information of the sensing window is determined, and the resource is sensed in the sensing window according to the determined parameter information of the sensing window, a phenomenon that a resource is sensed according to a fixed sensing window is avoided, thereby reducing power consumption of UE. In addition, the first UE determines the time span of the sensing window according to a quantity of optional resources obtained in a preset time such that the time span of the sensing window changes according to the quantity of optional resources. Therefore, a relationship between power consumption and performance of UE can be well balanced.

Figure 6:
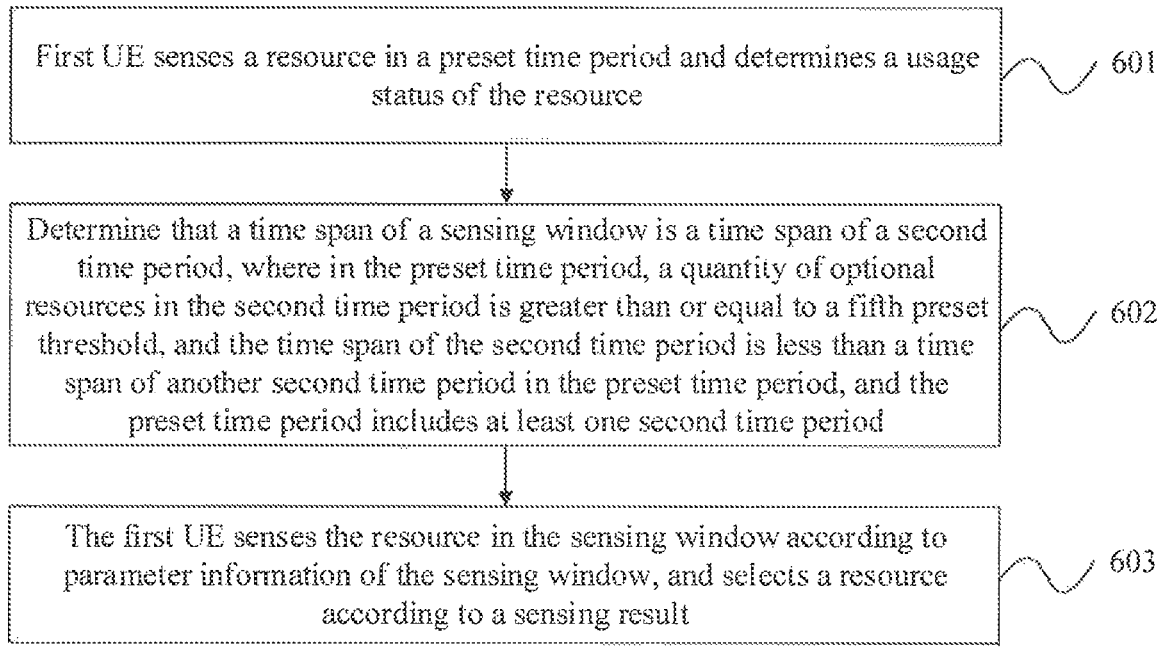
FIG. 6 is a schematic flowchart of Embodiment 6 of a resource selection method according to the present disclosure.

FIG. 6 is a schematic flowchart of Embodiment 6 of a resource selection method according to the present disclosure. Based on Embodiment 1 of the resource selection method, this embodiment provides detailed description of an embodiment in which first UE determines parameter information of a sensing window. As shown in FIG. 6, the method in this embodiment may include the following steps.

Step 601. The first UE senses a resource in a preset time period and determines a usage status of the resource.

The usage status of the resource includes a quantity of optional resources.

Step 602. Determine that a time span of the sensing window is a time span of a second time period, where in the preset time period, a quantity of optional resources in the second time period is greater than or equal to a fifth preset threshold, the time span of the second time period is less than a time span of another second time period in the preset time period, and the preset time period includes at least one second time period.

In this embodiment, after obtaining the quantity of optional resources in the preset time period, the first UE determines that the quantity of optional resources is greater than or equal to the fifth preset threshold in the preset time period, where the second time period has a shortest time span. For example, a sensing window during the $N^{th}$ time of sensing by the first UE is from (n−1000) ms to (n−1) ms, where n ms is a reference moment of current sensing. Assuming that after obtaining a quantity of optional resources from (n−1000) ms to (n−1) ms, the first UE determines that quantities of optional resources in two second time periods from (n−110) ms to (n−101) ms and from (n−130) ms and (n−111) ms each are greater than or equal to the fifth preset threshold. Assuming that (n+m) ms is a reference moment of the $(N+M)^{th}$ time of sensing by the first UE, 10 ms is used as a time span of a sensing window that is used during the $(N+M)^{th}$ time of sensing, and the sensing window during current sensing is from (n+m−110) ms to (n+m−101) ms.

Step 603. The first UE senses the resource in the sensing window according to the parameter information of the sensing window, and selects a resource according to a sensing result.

According to the resource selection method provided in this embodiment of the present disclosure, the parameter information of the sensing window is determined, and the resource is sensed in the sensing window according to the parameter information of the sensing window in order to perform resource selection. Because the parameter information of the sensing window is determined, and the resource is sensed in the sensing window according to the determined parameter information of the sensing window, a phenomenon that a resource is sensed according to a fixed sensing window is avoided, thereby reducing power consumption of UE. In addition, the first UE determines the time span of the sensing window according to a quantity of optional resources obtained in a preset time such that the time span of the sensing window changes according to the quantity of optional resources. Therefore, a relationship between power consumption and performance of UE can be well balanced.

Figure 7:
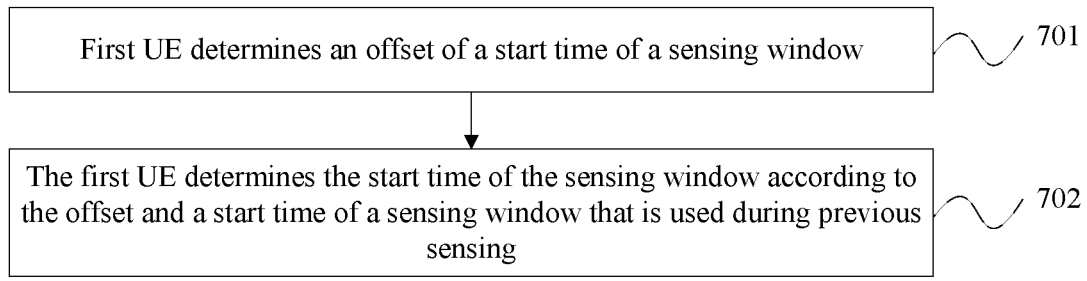
FIG. 7 is a schematic flowchart of Embodiment 7 of a resource selection method according to the present disclosure.

FIG. 7 is a schematic flowchart of Embodiment 7 of a resource selection method according to the present disclosure. Based on Embodiment 1 of the resource selection method, this embodiment provides detailed description of an embodiment in which first UE determines parameter information of a sensing window. As shown in FIG. 7, the method in this embodiment may include the following steps.

Step 701. The first UE determines an offset of a start time of the sensing window.

In this embodiment, the offset may be preconfigured, may be configured using a network, or may be predefined. Alternatively, the offset may be related to a time span of a sensing window that is used during previous sensing. For example, the offset is the same as the time span of the sensing window that is used during the previous sensing. Alternatively, the offset may be determined according to a result of previous sensing. For example, if a quantity of optional resources found by the first UE during previous sensing exceeds a threshold, the offset is 0, otherwise, the offset is not 0. Alternatively, the offset may be randomly selected by the first UE within a value range. A specific setting manner of the offset is not limited herein in this embodiment.

Step 702. The first UE determines the start time of the sensing window according to the offset and a start time of a sensing window that is used during previous sensing.

In this embodiment, after determining the offset of the start time of the sensing window, the first UE determines the start time of the sensing window according to the start time of the sensing window that is used during the previous sensing and the obtained offset. For example, a sensing window during the $N^{th}$ time of sensing by the first UE is from (n−10) ms to (n−1) ms, where n ms is a reference moment of current sensing. Assuming that (n+m) ms is a reference time of the $(N+1)^{th}$ time of sensing by the first UE and that an offset is p, a start time of a sensing window during current sensing is at (n+m−10+p) ms.

It should be noted that, when the first UE performs sensing, shifting is performed on a start time of a sensing window that is used during each sensing, or shifting is performed every n times of sensing, for example, shifting is performed every two sensing windows. A specific shifting manner is not limited herein in this embodiment.

According to the resource selection method provided in this embodiment of the present disclosure, the parameter information of the sensing window is determined, and the resource is sensed in the sensing window according to the parameter information of the sensing window in order to perform resource selection. Because the parameter information of the sensing window is determined, and the resource is sensed in the sensing window according to the determined parameter information of the sensing window, a phenomenon that a resource is sensed according to a fixed sensing window is avoided, thereby reducing power consumption of UE. In addition, because a start time of a sensing window of the UE has an offset, a phenomenon that the UE cannot find sufficient optional resources in a sensing window can be prevented.

Figure 8:
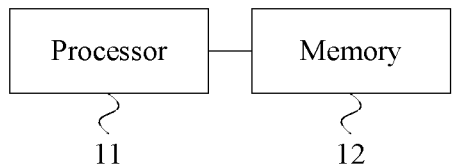
FIG. 8 is a schematic structural diagram of Embodiment 1 of UE according to the present disclosure.

FIG. 8 is a schematic structural diagram of Embodiment 1 of UE according to the present disclosure. The UE provided in this embodiment may implement each step of the method that is applied to the UE and that is provided in any embodiment of the present disclosure, and the detailed implementation process is not described herein again. Further, the UE provided in this embodiment includes a processor 11 and a memory 12 that is configured to store an instruction that can be executed by the processor 11.

The processor 11 is configured to determine parameter information of a sensing window, where the parameter information includes at least one of a start time, a time span, or a quantity.

The processor 11 is further configured to sense the resource in the sensing window according to the parameter information of the sensing window, and select a resource according to a sensing result.

According to the UE provided in this embodiment of the present disclosure, the parameter information of the sensing window is determined, the resource is sensed in the sensing window according to the parameter information of the sensing window, and the resource is selected according to the sensing result. Because the parameter information of the sensing window is determined, and the resource is sensed in the sensing window according to the determined parameter information of the sensing window, a phenomenon that a resource is sensed according to a fixed sensing window is avoided, thereby reducing power consumption of UE.

Optionally, in an embodiment of the present disclosure, the processor 11 is further configured to determine the parameter information of the sensing window according to a usage status of a resource.

Optionally, in an embodiment of the present disclosure, the usage status of the resource includes at least one of a first congestion level, a first resource reservation interval, a second resource reservation interval, a quantity of optional resources, or energy on the resource, and a resource reservation interval is a time interval between a resource used by second UE for current data transmission and a resource used by the second UE for next data transmission.

The UE provided in this embodiment may be configured to execute the technical solution of the resource selection method provided in any embodiment of the present disclosure. An implementation principle and a technical effect thereof are similar to those of the resource selection method, and details are not described herein again.

Figure 9:
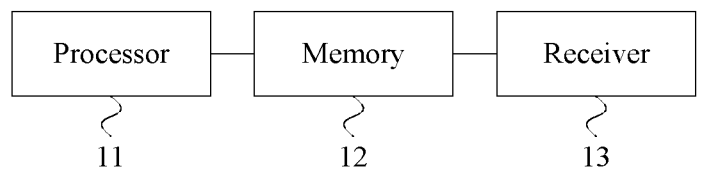
FIG. 9 is a schematic structural diagram of Embodiment 2 of UE according to the present disclosure.

FIG. 9 is a schematic structural diagram of Embodiment 2 of UE according to the present disclosure. As shown in FIG. 9, this embodiment is based on the embodiment shown in FIG. 8, and the UE may further include a receiver 13.

The receiver 13 is configured to receive first indication information sent by a base station or second UE, where the first indication information includes the first congestion level and/or the first resource reservation interval.

Alternatively, the processor 11 is further configured to determine the first congestion level according to the energy on the resource.

Alternatively, the receiver 13 is configured to receive second indication information sent by at least one second UE, where the second indication information includes a second congestion level and/or the second resource reservation interval.

The processor 11 is further configured to determine the first congestion level and/or the first resource reservation interval according to the second congestion level and/or the second resource reservation interval.

Optionally, the first resource reservation interval is a subset of the second resource reservation interval.

Optionally, the processor 11 is further configured to sort the second resource reservation interval.

The processor 11 is further configured to select, from the sorted second resource reservation interval, M resource reservation intervals as the first resource reservation interval, where M is a positive integer.

The UE provided in this embodiment may be configured to execute the technical solution of the resource selection method provided in any embodiment of the present disclosure. An implementation principle and a technical effect thereof are similar to those of the resource selection method, and details are not described herein again.

Figure 10:
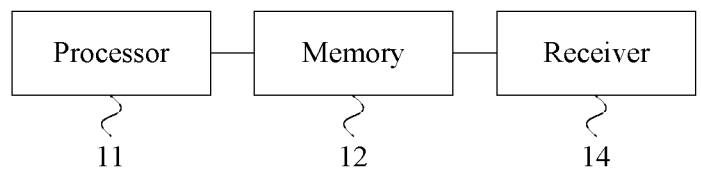
FIG. 10 is a schematic structural diagram of Embodiment 3 of UE according to the present disclosure.

FIG. 10 is a schematic structural diagram of Embodiment 3 of UE according to the present disclosure. As shown in FIG. 10, this embodiment is based on the embodiment shown in FIG. 8, and the UE further includes a receiver 14.

The receiver 14 is configured to receive third indication information, where the third indication information includes the parameter information of the sensing window.

Optionally, the processor 11 is further configured to sense the resource in a preset time period and determine the usage status of the resource.

Optionally, if the usage status of the resource includes the quantity of optional resources, the processor 11 is further configured to determine that a time span of the sensing window is a sum of time spans of N preset time periods, where a quantity of optional resources in the N preset time period is greater than or equal to the first preset threshold, or a sum of time spans of (N+1) preset time periods is greater than or equal to a second preset threshold, and N is a positive integer.

Optionally, if the usage status of the resource includes the quantity of optional resources, the processor 11 is further configured to determine that a time span of the sensing window is a time span of a first time period, where in the preset time period, a quantity of optional resources in the first time period is largest, and the preset time period includes at least one first time period.

Alternatively, the processor 11 is further configured to determine that a time span of the sensing window is a time span of a second time period, where in the preset time period, a quantity of optional resources in the second time period is greater than or equal to a fifth preset threshold, and the time span of the second time period is less than a time span of another second time period in the preset time period, and the preset time period includes at least one second time period.

The UE provided in this embodiment may be configured to execute the technical solution of the resource selection method provided in any embodiment of the present disclosure. An implementation principle and a technical effect thereof are similar to those of the resource selection method, and details are not described herein again.

Optionally, the processor 11 is further configured to determine an offset of the start time of the sensing window.

The processor 11 is further configured to determine the start time of the sensing window according to the offset and a start time of a sensing window that is used during previous sensing.

Optionally, the offset is related to a time span of the sensing window that is used during the previous sensing.

The UE provided in this embodiment may be configured to execute the technical solution of the resource selection method provided in any embodiment of the present disclosure. An implementation principle and a technical effect thereof are similar to those of the resource selection method, and details are not described herein again.

It may be clearly understood by persons skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the other approaches, or all or a part of the technical solutions may be implemented in the form of a software product. The software product is stored in a storage medium and includes several instructions for instructing a computer device (which may be a personal computer, a server, a network device, or the like) or a processor to perform all or a part of the steps of the methods described in the embodiments of the present application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A resource selection method, comprising:
adaptively determining, by a first user equipment (UE), parameter information of a sensing window according to a usage status of a resource, wherein the parameter information comprises at least one of a start time, a time span, or a quantity, wherein the usage status comprises an indication that the resource is idle or busy, a first resource reservation interval, and a second resource reservation interval, and wherein the first resource reservation interval comprises a subset of the second resource reservation interval;
sensing, by the first UE, the resource in the sensing window according to the parameter information of the sensing window; and
selecting, by the first UE, the resource according to a sensing result.

2. The resource selection method of claim 1, wherein the usage status further comprises a first congestion level, a quantity of optional resources, and energy on the resource.

3. The resource selection method of claim 1, wherein each of the first resource reservation interval and the second resource reservation interval comprises a time interval between a resource used by one of the first UE or a second UE for current data transmission and a resource used by the first UE or the second UE for next data transmission.

4. The resource selection method of claim 1, wherein before adaptively determining the parameter information of the sensing window, the resource selection method further comprises receiving, by the first UE, first indication information comprising a first congestion level or the first resource reservation interval from a base station or a second UE.

5. The resource selection method of claim 1, wherein before adaptively determining the parameter information of the sensing window, the resource selection method further comprises determining, by the first UE, a first congestion level according to energy on the resource.

6. The resource selection method of claim 1, wherein before adaptively determining the parameter information of the sensing window, the resource selection method further comprises:
receiving, by the first UE, second indication information comprising a second congestion level or the second resource reservation interval from a base station or a second UE; and
determining, by the first UE, a first congestion level or the first resource reservation interval according to the second congestion level or the second resource reservation interval.

7. The resource selection method of claim 1, wherein adaptively determining the parameter information of the sensing window comprises receiving, by the first UE, third indication information comprising the parameter information of the sensing window.

8. The resource selection method of claim 1, wherein before adaptively determining the parameter information of the sensing window according to the usage status of the resource, the resource selection method further comprises:

sensing, by the first UE, the resource in a preset time period; and determining, by the first UE, the usage status of the resource.

9. The resource selection method of claim 1, wherein when the usage status of the resource comprises a quantity of optional resources, adaptively determining the parameter information of the sensing window according to the usage status of the resource comprises determining, by the first UE, that a time span of the sensing window comprises a sum of time spans of N preset time periods, wherein a quantity of optional resources in the N preset time periods is greater than or equal to a first preset threshold or a sum of time spans of (N+1) preset time periods being greater than or equal to a second preset threshold, and wherein the N comprises a positive integer.

10. The resource selection method of claim 1, wherein adaptively determining the parameter information of the sensing window comprises:

determining, by the first UE, an offset of the start time of the sensing window; and determining, by the first UE, the start time of the sensing window according to the offset and a start time of a sensing window used during previous sensing.

11. The resource selection method of claim 10, wherein the offset is related to a time span of the sensing window used during the previous sensing.

12. A user equipment (UE), comprising:

a memory configured to store an instruction; and a processor coupled to the memory, wherein the instruction causes the UE to be configured to:

adaptively determine parameter information of a sensing window according to a usage status of a resource, wherein the parameter information comprises at least one of a start time, a time span, or a quantity, wherein the usage status comprises an indication that the resource is idle or busy, a first resource reservation interval, and a second resource reservation interval, and wherein the first resource reservation interval comprises a subset of the second resource reservation interval;

sense the resource in the sensing window according to the parameter information of the sensing window; and select the resource according to a sensing result.

13. The UE of claim 12, wherein the usage status further comprises a first congestion level, a quantity of optional resources, and energy on the resource.

14. The UE of claim 12, wherein each of the first resource reservation interval and the second resource reservation interval comprises a time interval between a resource used by one of the UE or a second UE for current data transmission and a resource used by the UE or the second UE for next data transmission.

15. The UE of claim 12, wherein before adaptively determining the parameter information of the sensing window, the instruction further causes the UE to be configured to receive first indication information comprising a first congestion level or the first resource reservation interval from a base station or a second UE.

16. The UE of claim 12, wherein before adaptively determining the parameter information of the sensing window, the instruction further causes the UE to be configured to determine a first congestion level according to energy on the resource.

17. The UE of claim 12, wherein before adaptively determining the parameter information of the sensing window, the instruction further causes the UE to be configured to:

receive second indication information comprising a second congestion level or the second resource reservation interval from a base station or a second UE; and determine a first congestion level or the first resource reservation interval according to the second congestion level or the second resource reservation interval.

18. The UE of claim 12, wherein the instruction causes the UE to be configured to adaptively determine the parameter information of the sensing window by receiving third indication information comprising the parameter information of the sensing window.

19. The UE of claim 12, wherein before adaptively determining the parameter information of the sensing window according to the usage status of the resource, the instruction further causes the UE to be configured to:

sense the resource in a preset time period; and determine the usage status of the resource.

20. A computer program product comprising computer-executable instructions embodied on a non-transitory computer-readable medium that, when executed by a processor, cause an apparatus to:

adaptively determine parameter information of a sensing window according to a usage status of a resource, wherein the parameter information comprises at least one of a start time, a time span, or a quantity, wherein the usage status comprises an indication that the resource is idle or busy, a first resource reservation interval, and a second resource reservation interval, and wherein the first resource reservation interval comprises a subset of the second resource reservation interval;

sense the resource in the sensing window according to the parameter information of the sensing window; and select the resource according to a sensing result.

* * * * *